(12) United States Patent
Blaser et al.

(10) Patent No.: US 9,821,728 B2
(45) Date of Patent: Nov. 21, 2017

(54) MAGNETIC PARTS HOLDER AND MOTOR VEHICLE TAILGATE ASSEMBLY INCORPORATING SAME

(71) Applicant: FORD GLOBAL TECHNOLOGIES, LLC, Dearborn, MI (US)

(72) Inventors: Kevin J. Blaser, Brighton, MI (US); Joshua Robert Hemphill, White Lake, MI (US); Vincent Anthony Chimento, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/739,481

(22) Filed: Jun. 15, 2015

(65) Prior Publication Data

US 2016/0362068 A1    Dec. 15, 2016

(51) Int. Cl.
  *B60R 11/06*  (2006.01)
  *B60P 3/00*  (2006.01)
  *B62D 33/03*  (2006.01)
  *B60R 11/00*  (2006.01)

(52) U.S. Cl.
  CPC ............... *B60R 11/06* (2013.01); *B60P 3/00* (2013.01); *B62D 33/03* (2013.01); *B60R 2011/007* (2013.01); *B60R 2011/0052* (2013.01); *B60R 2011/0063* (2013.01)

(58) Field of Classification Search
  CPC ............ B60R 11/06; B62D 33/03; B60P 3/00
  USPC ..................... 296/57.1, 50, 61, 62
  See application file for complete search history.

(56) References Cited

U.S. PATENT DOCUMENTS

| 4,763,945 | A | 8/1988 | Murray |
| 6,224,127 | B1 | 5/2001 | Hodge |
| 7,905,532 | B2 | 3/2011 | Johnson |
| 8,172,309 | B1 | 5/2012 | Weir |
| 8,459,716 | B2 | 6/2013 | Kaplan |
| 2012/0292359 | A1 | 11/2012 | O'Dell |
| 2016/0023691 | A1* | 1/2016 | Bales ............... B60R 9/06 296/37.6 |

* cited by examiner

*Primary Examiner* — Joseph D Pape
(74) *Attorney, Agent, or Firm* — Jason Rogers; King & Schickli, PLLC

(57) ABSTRACT

A motor vehicle tailgate assembly is provided. That tailgate assembly includes a tailgate body and a magnetic element inside the tailgate body forming a magnetic parts holder on an outer surface of the tailgate body.

15 Claims, 4 Drawing Sheets

MAGNETIC PARTS HOLDER AND MOTOR VEHICLE TAILGATE ASSEMBLY INCORPORATING SAME

TECHNICAL FIELD

This document relates generally to the motor vehicle field and, more particularly, to a magnetic parts holder and to a motor vehicle tailgate assembly incorporating a magnetic parts holder.

BACKGROUND

Many pickup truck operators lower their tailgates to a horizontal position and utilize those tailgates as a shelf or workbench for working on various projects. Often those projects have relatively small ferromagnetic parts such as nuts, bolts, screws and washers. This document relates to a new and improved magnetic parts holder and tailgate assembly incorporating a magnetic parts holder for positively holding those parts on the tailgate at a convenient and accessible location as required to complete the project at hand.

SUMMARY

In accordance with the purposes and benefits described herein, a magnetic parts holder is provided for a motor vehicle. That magnetic parts holder comprises a body panel including a cavity, a non-ferromagnetic cover closing the cavity and a magnetic element carried on a back side of the non-ferromagnetic cover, where hidden from sight when the non-ferromagnetic cover is closing the cavity.

In accordance with an additional aspect, a motor vehicle tailgate assembly is provided. That motor vehicle tailgate assembly comprises a tailgate body and a magnetic element inside the tailgate body forming a magnetic parts holder on an outer surface of the tailgate body.

In one possible embodiment, the tailgate body includes an access cover. In one possible embodiment, that access cover is made from a paramagnetic material. In one particularly useful embodiment, that access cover is made from aluminum/aluminum alloy.

The access cover may be provided on an inner face of the tailgate body so as to be facing upward when the tailgate is lowered into a horizontal position.

In one possible embodiment, the magnetic element is provided against the inner surface of the access cover. In one possible embodiment, the access cover includes a recess overlying the magnetic element in which magnetic parts will be held by magnetic attraction. That recess may assume any shape including, for example, circular or oval.

In one possible embodiment, the magnetic element corresponds in size and shape to the overlying recess. The magnetic element may be secured to the access panel underlying the recess by means of an adhesive or a fastener such as at least one rivet.

In accordance with yet another aspect, a method of providing a tailgate with a magnetic parts holder is provided. That method comprises providing the tailgate with an access panel of paramagnetic material and mounting a magnetic element inside the tailgate against the access panel. The method may further include providing the access panel with a recess overlying the magnetic material. Further, the method may include fastening the magnetic element to the access panel by means of an adhesive, a fastener or, for example, at least one rivet. Still further, the method may include using a magnetic element having a size and shape that corresponds to the overlying recess.

In the following description, there are shown and described several preferred embodiments of the magnetic parts holder and motor vehicle tailgate assembly. As it should be realized, the parts holder and assembly are capable of other, different embodiments and their several details are capable of modification in various, obvious aspects all without departing from the magnetic parts holder and assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the magnetic parts holder and tailgate assembly and together with the description serve to explain certain principles thereof. In the drawing figures.

Reference will now be made in detail to the present preferred embodiments of the magnetic parts holder and tailgate assembly, examples of which are illustrated in the accompanying drawing figures.

DETAILED DESCRIPTION

Figure 1:
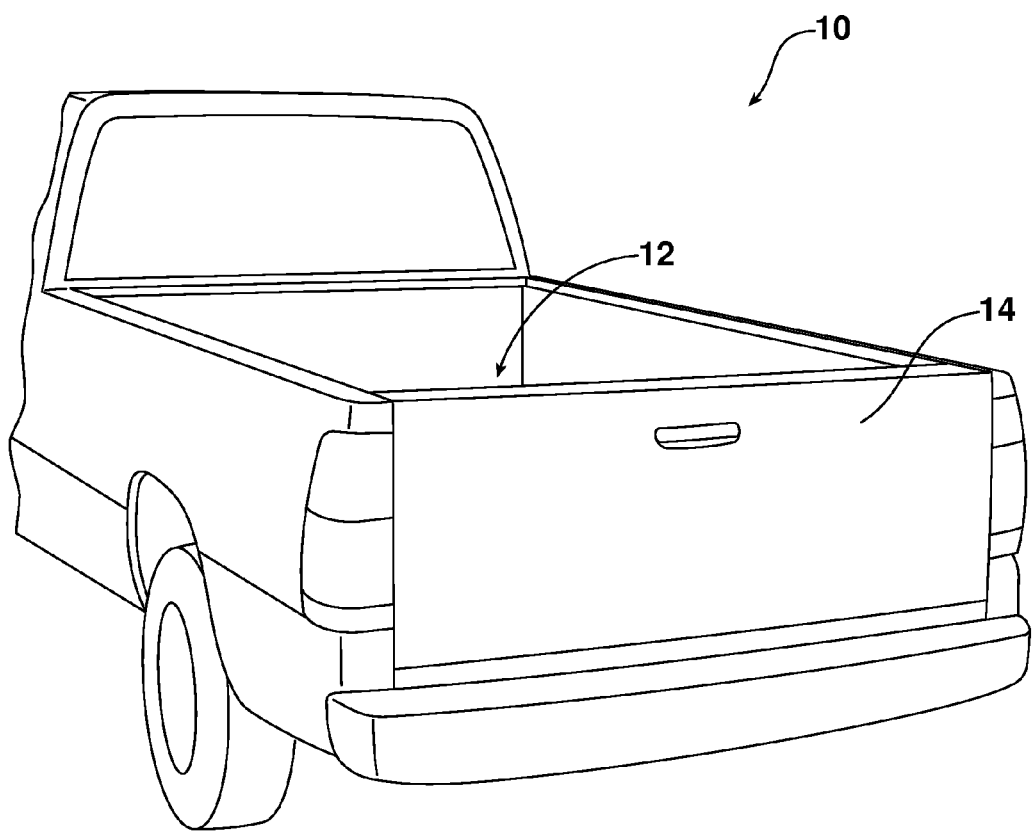
FIG. 1 is a rear perspective view of a pickup truck incorporating a tailgate assembly with a magnetic parts holder.

Reference is now made to FIG. 1 illustrating a pickup truck 10 including a cargo bed 12 and a tailgate assembly 14.

Figure 2:
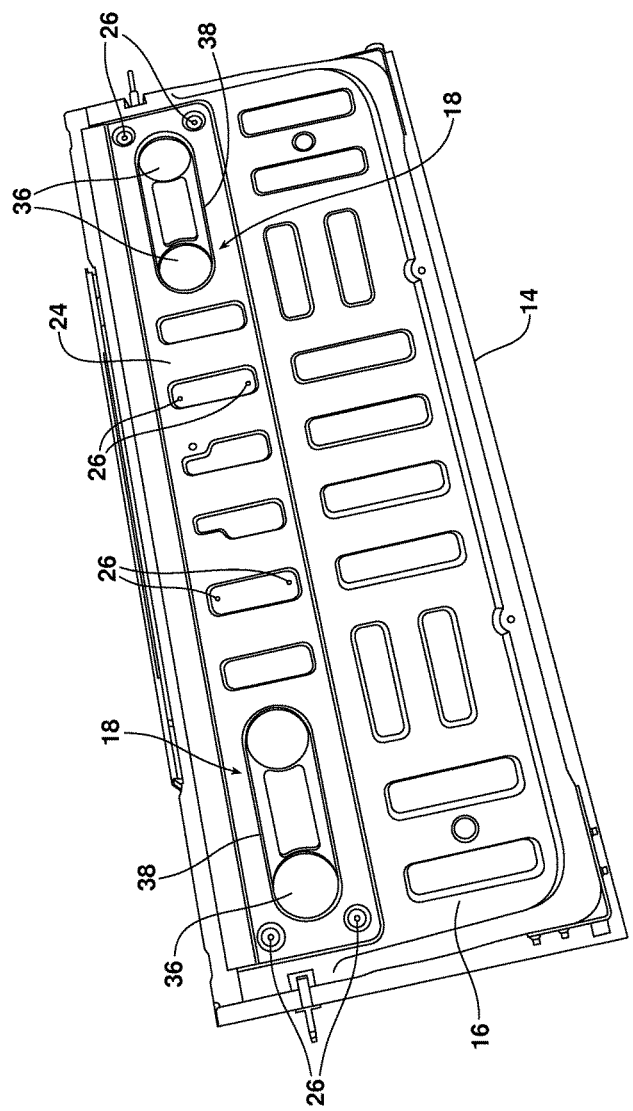
FIG. 2 is a detailed perspective view of the inner face of a motor vehicle tailgate incorporating an access cover made of non-paramagnetic material.
Figure 3:
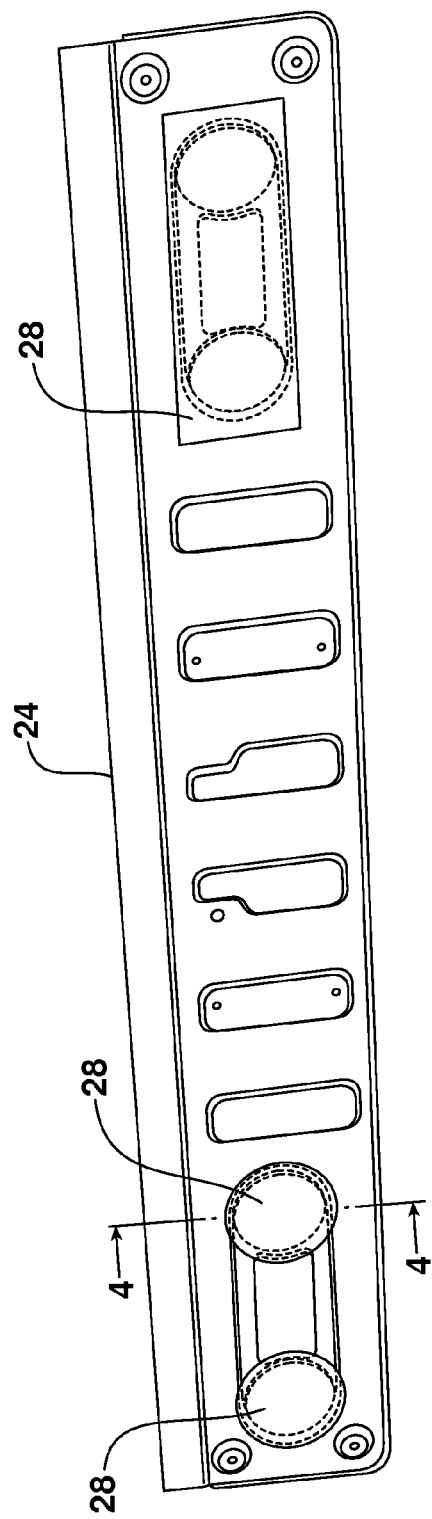
FIG. 3 is a detailed perspective view of the backside of the access cover illustrated in FIG. 2 showing three different magnetic elements secured to that backside or rear face.
Figure 4:
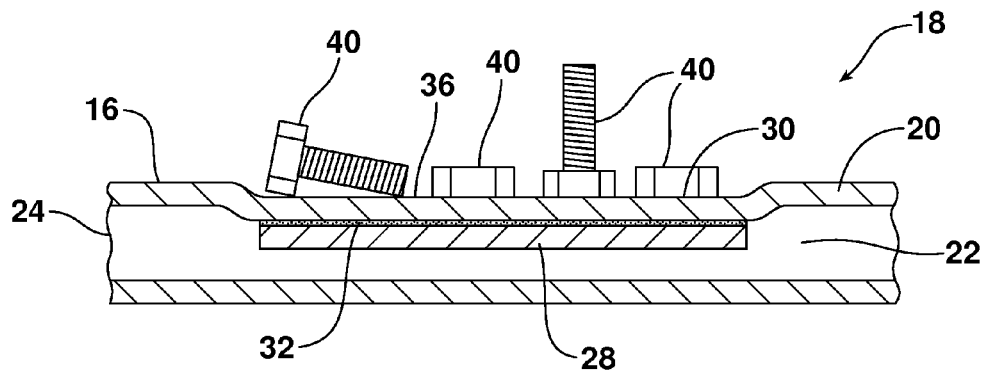
FIG. 4 is a cross-sectional view through the access cover of FIG. 3 showing the magnetic element connected to the backside or rear face of the access panel and some nuts and bolts of ferromagnetic material held in a circular recess on the face of the tailgate by the magnetic force of the magnetic element.

Reference is now made to FIG. 2 which is a detailed perspective view of the tailgate 14 and, more specifically, the inner face or wall 16 of the tailgate incorporating or including a magnetic parts holder generally designated reference numeral 18. As illustrated in FIGS. 2-4, the magnetic parts holder 18 comprises the inner tailgate body panel 20 which includes a cavity/opening 22. A non-ferromagnetic cover or access panel 24 closes the cavity and may, for example, be secured in place by means of a plurality of fasteners such as screws 26. One or more magnetic elements 28 are carried on a back side 30 of the access panel or cover 24. Each magnetic element 28 may take the form of a thin sheet of magnetic material so as to require very little space within the cavity/opening 20 thereby leaving that space available for other components such as, for example, a cargo bed entry assist ladder of the type disclosed in published U.S. Patent Application 2014/0203587 (not shown).

Figure 5:
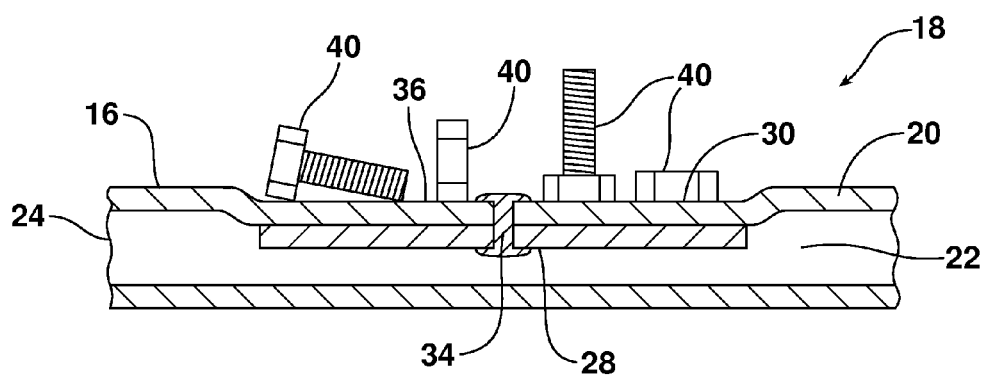
FIG. 5 is a view similar to FIG. 4 but showing an alternative embodiment wherein the magnetic element is attached to the panel beneath the recess by means of a rivet.

In the embodiment illustrated in FIG. 3, three magnetic elements 28 are provided. One of the magnetic elements 28 is secured to the backside or rear face 30 of the access panel 24 by means of an adhesive 32 (see also FIG. 4). The other two magnetic elements 28 are secured in place by means of a fastener such as the illustrated rivet 34 (see FIG. 5).

As illustrated, the access cover 24 includes one or more recesses 36, 38 of varying shape. Recesses 36 are circular in shape and they may be a part of a broader or larger recess of oval shape 38. As illustrated, the magnetic elements 28 may correspond in size and shape to the overlying recess (note the circular magnetic elements 28 under the circular recesses 36 at the left side of FIG. 3 and note FIGS. 4 and 5) or they may extend substantially across the entire recess (note the magnetic element 28 at the right side of FIG. 3 extending across the oval recess 38).

In any embodiment, the access cover 24 is preferably made from a non-ferromagnetic material. In one possible embodiment, the access cover is made from a paramagnetic material. In one particularly useful embodiment, the access cover 24 is made from aluminum or an aluminum alloy. While a ferromagnetic material would serve to disperse the magnetic field of the magnetic element 28 throughout the ferromagnetic material of the tailgate so that no part holding quality would exist, non-ferromagnetic/paramagnetic materials such as aluminum and aluminum alloy allow the magnetic field to pass relatively freely through the cover with the strength necessary to positively hold parts such as the nuts and bolts 40 in the recess 36 at a convenient and easily accessible location. This positive force is typically sufficient to prevent screws or other ferromagnetic parts from rolling away and being lost when inadvertently bumped or disturbed.

When a ferromagnetic rivet 34 is used to secure the magnetic element 28 to the non-ferromagnetic/paramagnetic access cover 24, that rivet extends through both the magnetic element and the cover. The exposed portion of the rivet 34 at the outer surface of the cover 24 acts as a concentration point for the magnetic field of the magnetic element 28 providing an even higher force to hold a ferromagnetic object 40 in place on the surface of the cover.

It should also be appreciated that a method of providing a tailgate 14 with a magnetic parts holder 18 is disclosed. That method may be broadly described as comprising the steps of providing the tailgate 14 with an access cover 24 of paramagnetic material and mounting a magnetic element 28 inside the tailgate 14 against the access cover. Further, the method may include providing the access cover 24 with a recess 36, 38 overlying the magnetic element 28.

Still further, the method may be described as further including the step of fastening the magnetic element 28 to the access cover 24 by means of an adhesive 32 or a fastener such as a rivet 34. Still further, the method may include using a magnetic element 28 sized and shaped to correspond to the overlying recess 36, 38 if desired.

In summary, numerous benefits result when employing the concepts disclosed in this document. The tailgate assembly 14 incorporates a magnetic parts holder 18 on an inner surface thereof that rest substantially horizontal when the tailgate is open. The combination of the recesses 36, 38 and cooperating underlying magnetic elements 28 ensure that small ferromagnetic parts such as nuts, bolts, screws and washers 40 are positively held in place in the recess at a location that may be conveniently accessed when one wishes to retrieve a nut, bolt, screw or washer and use it to complete the task at hand. Advantageously, the positive holding force provided by the magnetic element 28 through the access cover 24 of non-ferromagnetic material aids in preventing small ferromagnetic parts such as nuts, bolts, screws and washers 40 from being inadvertently lost while working. Accordingly, the tailgate assembly 14, as set forth and described in this document, provides a significant advantage and represents an advance in the art.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A motor vehicle tailgate assembly, comprising:
   a tailgate body including an access cover; and
   a magnetic element inside said tailgate body forming a magnetic parts holder on an outer surface of said tailgate body, wherein said access cover includes a recess overlying said magnetic element in which magnetic parts may be held by magnetic attraction and wherein said magnetic element corresponds in size and shape to said overlying recess.

2. The motor vehicle tailgate assembly of claim 1, wherein said access cover is made from a paramagnetic material.

3. The motor vehicle tailgate assembly of claim 1, wherein said access cover is provided on an inner face of said tailgate body.

4. The motor vehicle tailgate assembly of claim 3, wherein said magnetic element is provided against an inner surface of said access cover.

5. The motor vehicle tailgate assembly of claim 1, wherein said recess is circular in shape.

6. The motor vehicle tailgate assembly of claim 1, wherein said recess is oval in shape.

7. The motor vehicle tailgate assembly of claim 1, wherein said magnetic element is secured to said access cover underlying said recess by means of an adhesive.

8. The motor vehicle tailgate assembly of claim 1, wherein said magnetic element is secured to said access cover underlying said recess by means of a fastener.

9. The motor vehicle tailgate assembly of claim 8, wherein said fastener is at least one rivet.

10. The motor vehicle tailgate assembly of claim 1, wherein said access cover is constructed from aluminum/aluminum alloy.

11. A magnetic parts holder comprising:
    a body panel including a cavity;
    a non-ferromagnetic cover closing said cavity, wherein said non-ferromagnetic cover includes a recess; and
    a magnetic element corresponding in size and shape to said recess and carried on a back side of said non-ferromagnetic cover where hidden from sight when said non-ferromagnetic cover is closing said cavity.

12. A method of providing a tailgate with a magnetic parts holder, comprising:
    providing said tailgate with an access cover of paramagnetic material;
    mounting a magnetic element inside said tailgate against said access cover; and
    providing said access cover with a recess overlying said magnetic element,
    wherein said magnetic element is sized and shaped to correspond to said recess.

13. The method of claim 12, further including fastening said magnetic element to said access cover by means of an adhesive.

14. The method of claim 12, further including fastening said magnetic element to said access cover by means of a fastener.

15. The method of claim 12, further including fastening said magnetic element to said access cover by means of at least one rivet.

\* \* \* \* \*